D. M. SUSI AND N. H. BARROWS.
VINE SEPARATOR FOR POTATO HARVESTERS.
APPLICATION FILED AUG. 5, 1920.
1,412,426.
Patented Apr. 11, 1922.
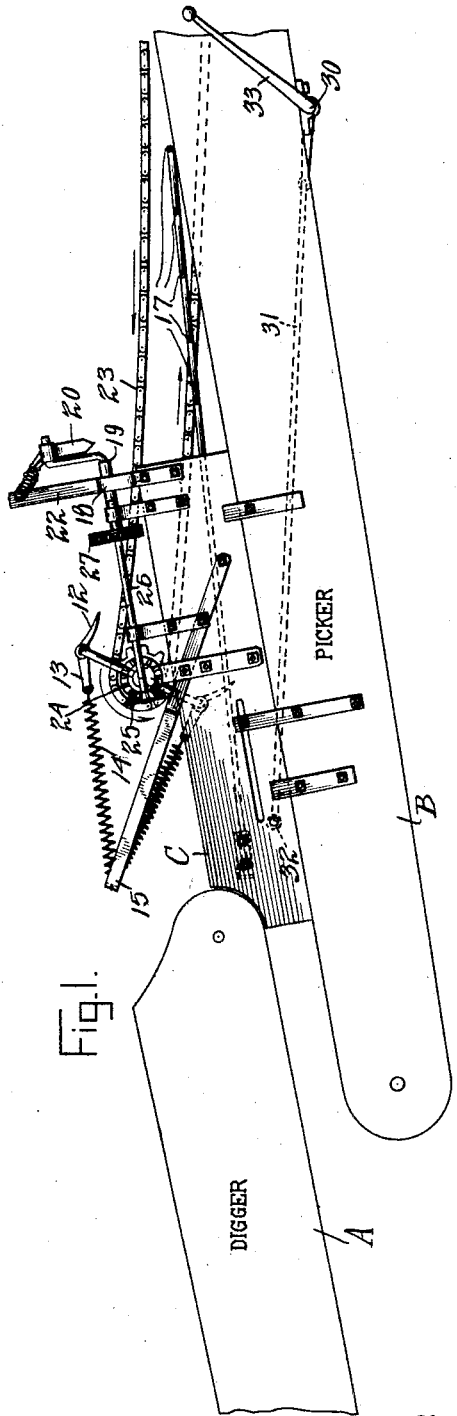
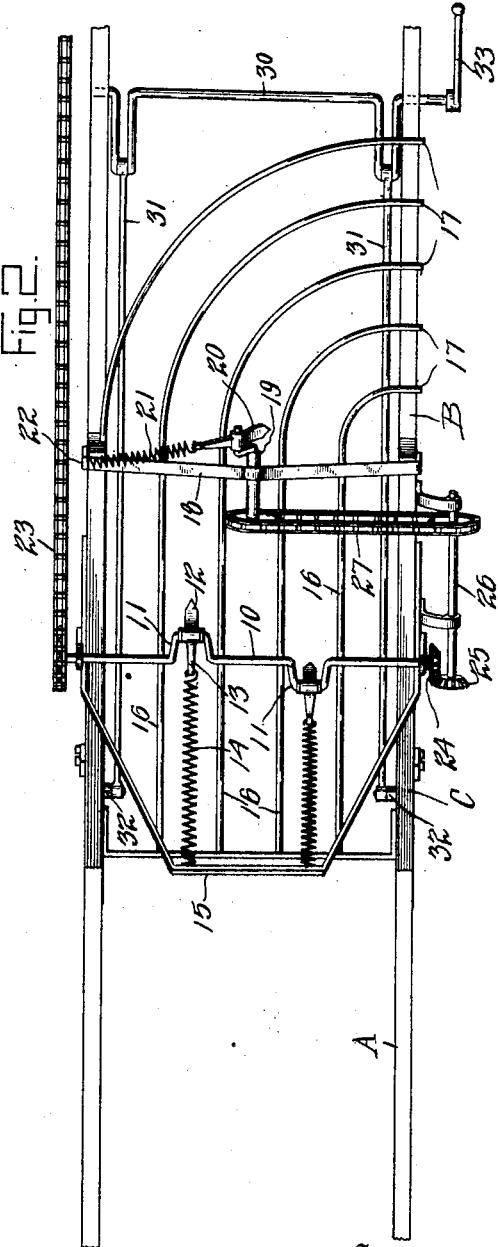
Inventors
Dominick M. Susi
Nathaniel H. Barrows

UNITED STATES PATENT OFFICE.

DOMINICK M. SUSI AND NATHANIEL H. BARROWS, OF WATERVILLE, MAINE.

VINE SEPARATOR FOR POTATO HARVESTERS.

1,412,426.  Specification of Letters Patent.  Patented Apr. 11, 1922.

Application filed August 5, 1920. Serial No. 401,304.

*To all whom it may concern:*

Be it known that we, DOMINICK M. SUSI and NATHANIEL H. BARROWS, said Susi a citizen of Italy and said BARROWS a citizen of the United States, both residing at Waterville, in the county of Kennebec and State of Maine, have invented certain new and useful Improvements in Vine Separators for Potato Harvesters, of which the following is a specification.

The object of our invention is to provide an attachment for potato harvesters, particularly of the type shown in application No. 360,091, filed February 20, 1920, by G. W. Wiseman, for separating the vines from the potatoes and discharging them to one side of the machine as the work of harvesting progresses, thereby freeing the machine of the vines at a point before they clog the picker, all as will be hereinafter more fully described and claimed.

Referring to the accompanying drawings, which are made a part hereof and on which similar reference characters indicate similar parts, Figure 1 is a side elevation of a portion of a potato harvester showing the rear end of the digger and the center portion of the picker or separator, and Figure 2 a top or plan view of a portion thereof.

In said drawings the portions marked A represent the digger, B the picker, and C the frame of our attachment.

The frame C is mounted to slide on the top edge of the frame of the picker or separator proper and is provided with a cross shaft 10 having a series of cranks 11 extending in different axial directions on which are pivoted "kickers" 12, the rear ends 13 of which are connected by springs 14 with a part of the frame 15. Beneath said kickers and in a position to receive the vines, potatoes, and dirt from the digger, is an open bottom formed of rods 16 appropriately spaced to support the tops and extending for a distance in line with the picker frame and then turning to one side as shown in Figure 2, terminating in points 17 adapted to discharge beyond one side of the frame. A cross-support 18 extends from one side of the picker to the other and a crank shaft 19 is mounted therein having a kicker 20 on its outer end, the rear end of which is connected by a spring 21 to a point 22 on the side of the frame. Crank shaft 10 has a sprocket on one end connected by a sprocket chain 23 with the power and on the other end of said shaft 10 is mounted a pinion 24 which meshes with another pinion 25 on a short shaft 26 which has a sprocket connected by a sprocket chain 27 with another sprocket on shaft 19.

By this means the potato tops are fed along over the bottom composed of the rods 16 until they pass under the bar 18 where they are further assisted in their movement toward the side of the machine by the kicker 20 and discharged over the side.

The operator is enabled by means of the crank-shaft 30, rods 31 connecting the cranks thereof with pivots 32 on frame C and the lever 33 to slide from C back and forth out of the way to allow the digger to turn at the end of the rows.

Having thus fully described our said invention, what we claim as new and desire to secure by Letters Patent, is—

1. The combination with a potato harvester of a vine removing attachment comprising a slotted bottom positioned to receive potato vines from the harvester and curved to extend to one side of the machine, vibrating means for yieldably actuating and advancing the potato vines along said bottom and other vibrating means at an angle to the first mentioned vibrating means for discharging the vines over the side of the machine, substantially as set forth.

2. The combination with a potato harvester of a vine separating and removing attachment comprising a frame having a bottom composed of rods curved to extend over the side of the machine, vibrating forks positioned to actuate said vines with a yielding motion along said bottom, a vibrating fork at an angle to the first mentioned forks to feed and discharge the vines over the side of the machine, and means for driving said forks, substantially as set forth.

3. A vine separating attachment for potato diggers comprising a frame, a bottom therefor having open spaces to hold the vines but permit passage of potatoes, kickers to move the vines along the picker, springs attached at one end to the kickers and at the other to the frame, and means for actuating the kickers, substantially as set forth.

4. In a potato harvester, the combination with a picker to receive the potatoes from the digger and separate the dirt therefrom, of a vine removing attachment comprising a slatted bottom with the slats directed to discharge over the side of the machine, a set of kickers for yieldably actuating said vines lengthwise of the machine and a set of kickers for actuating them yieldably crosswise of the same and means for actuating said kickers, substantially as set forth.

5. In a potato harvester, the combination of a picker to receive the potatoes from the digger and separate the dirt therefrom, and an attachment for separating the vines comprising a frame mounted to slide on the picker, an open bottom formed to guide the vines to one side of the machine, and means for actuating the vines along said bottom.

6. In a potato harvester the combination of a picker to receive potatoes and separate the dirt therefrom, and an attachment for separating the vines slidably supported on the picker and normally positioned adjacent the digger to receive the material elevated thereby, substantially as set forth.

7. In a potato harvester the combination of a picker to receive potatoes and separate the dirt therefrom, and an attachment for separating the vines slidably supported on the picker, and having one end shaped to fit under the end of the digger to receive the material elevated thereby, substantially as set forth.

8. A vine separator comprising a frame, a bottom therefor having open spaces to hold the vines but permit passage of potatoes; a transverse crank-shaft, kickers on the cranks to move the vines along, and springs attached at one end to the kickers and at the other to the frame, substantially as set forth.

9. In a potato harvester the combination with a picker to receive potatoes and separate the dirt therefrom, and a vine removing attachment comprising a slatted bottom with the slats adapted to discharge over the side of the machine, a plurality of rotary crank shafts carrying kickers for actuating such vines, the kickers on the first crank shaft acting on the vines to move them lengthwise of the machine and the kickers on a subsequent crank shaft moving them crosswise over the side of the machine to eject them therefrom, substantially as set forth.

In witness whereof, we have hereunto set our hands and seals at Waterville, Maine, this 13th day of July, A. D. nineteen hundred and twenty.

DOMINICK M. SUSI. [L. S.]
    NATHANIEL H. BARROWS. [L. S.]

Witnesses:
 THOMAS N. WEEKS,
 KATHERINE C. WEEKS.